United States Patent [19]
Davenport et al.

[11] Patent Number: 5,187,739
[45] Date of Patent: Feb. 16, 1993

[54] ANSWER SUPERVISION CIRCUIT FOR PAYSTATION TELEPHONE WITH NON-MUTED MICROPHONE

[75] Inventors: Marcus K. Davenport, Cumming; Richard K. Shipman, Woodstock; Thomas D. Young, Snellville; Stephen H. Strode, Norcross, all of Ga.

[73] Assignee: International Teleservice Corp., Melbourne, Fla.

[21] Appl. No.: 745,594

[22] Filed: Aug. 6, 1991

[51] Int. Cl.⁵ .......................................... H04M 17/02
[52] U.S. Cl. ................................... 379/155; 379/153; 379/151
[58] Field of Search ............... 379/132, 149, 151, 199, 379/421, 153, 155

[56] References Cited
U.S. PATENT DOCUMENTS
4,698,840 10/1987 Dively et al. .................. 379/155 X Primary Examiner—Stafford D. Schreyer
Attorney, Agent, or Firm—Evenson, Wands, Edwards, Lenahan & McKeown

[57] ABSTRACT

A call progress circuit for both a customer owned, coin operated telephone and a regulated telephone is provided that does not mute the paystation's transmitter, so that voice signals from the calling party may be heard by the called party, thereby preventing an answering party from hanging up prematurely. The call progress circuit employs a transmitter-sourced audio signal discriminator which monitors audio signals placed on the line from the called station, the calling paystation and a central office, and controllably removes or subtracts out those audio signals that originate at the paystation transmitter. The discriminator includes a pair of tunable bandpass filters respectively associated with a telephone line receiver and the paystation transmitter circuit. Coupled to these filters is an audio spectrum scanner which sequentially adjusts the sensitivity characteristics of the filters. Q-adjustment of each filter is effected by controlling the value of a time constant setting resistor that determines the transfer function of each of a set of filter stages, with tuning of the filter's center frequency being a function of the duty cycle of a variation in each stage's resistor value. The output of the line receiver filter is coupled through a transmitter-modifier representative of the effects of the circuit components and the line, so as to adjust transmitter-sourced audio signals to a level that will permit them to be correctly excised from the receiver filter's output.

11 Claims, 2 Drawing Sheets

ANSWER SUPERVISION CIRCUIT FOR PAYSTATION TELEPHONE WITH NON-MUTED MICROPHONE

FIELD OF THE INVENTION

The present invention relates in general to telephone systems and is particularly directed to an answer supervision circuit for both a customer owned, coin operated telephone (COCOT) and a regulated telephone, in which the microphone in the transmitter portion of the paystation's handset is not muted, so that when the called party answers a call sourced from the paystation, a reply voiced by the calling party will be heard by the called party, thereby avoiding the problem of a frustrated called party hanging up due to a silent (muted-mike) line condition.

BACKGROUND OF THE INVENTION

In order to determine that a call placed from a non-regulated or COCOT paystation telephone has been answered by the called station, it is customary for the answer supervision or call progress circuit which carries out this task to monitor the line for presence of voice signals that originate at the called station when a party at the called station picks up the line. Because voice signals may also be placed on the line from the calling paystation, which could deceive the answer supervision circuit, the paystation transmitter's microphone is normally muted until it has been confirmed that the called party has answered the call. Unfortunately, this muting of the paystation microphone makes it impossible for the called party to receive voice signals from the calling paystation. Namely, when the called party answers the call (for example, by saying 'Hello'), any voice reply by the calling party will not be placed on the line until the answer supervision circuit has determined that voice from the called station is present on the line and has removed the muting of the calling party's microphone. Depending upon the performance of voice detection circuitry employed by the call progress circuit, the delay involved before the mute is removed may be significant enough to frustrate the called party into thinking that the line is dead, whereby the called party hangs up. Thus, although muting of the COCOT's microphone is intended to prevent the calling party's voice from interfering with answer verification, it introduces a problem of its own, to wit—the answering party hanging up when no reply from the muted calling party is heard.

SUMMARY OF THE INVENTION

In accordance with the present invention, the above mentioned problems are obviated by a new and improved answer supervision or call progress circuit that is installable in a customer owned, coin operated telephone, which does not require that the paystation transmitter's microphone be muted or disabled in the course of answer verification. By not muting the paystation's transmitter, audio (voice) signals from the calling party are placed on the line so that they may be heard by the called party, and thereby preventing an answering party from hanging up prematurely.

Pursuant to the present invention, the call progress circuit employs a transmitter-sourced audio signal discriminator which monitors all audio signals that have been placed on the line, either from the called station or the calling paystation, and controllably removes or subtracts out those audio signals that originate at the paystation transmitter during the answer supervision operation The transmitter audio signal discriminator preferably includes a pair of tunable (adjustable-Q) bandpass filters respectively associated with the telephone line receiver and the paystation transmitter circuit Coupled to these filters is an audio spectrum scanner which sequentially adjusts the sensitivity characteristics of the filters over a range of frequencies that encompasses both voice and specified signalling (e.g. busy and ringing tones) expected to be encountered on the telephone line. Q-adjustment of each filter is preferably accomplished by controlling the value of a time constant setting resistor that determines the transfer function of each of a set of cascaded filter stages, with tuning of the filter's center frequency being a function of the duty cycle of a variation in each stage's resistor value. Alternatively tuning of the filter's center frequency could be performed as a function of frequency (as would be the case of using a large current drain, switched capacitor filter network, which however, requires more power).

As the adjustable Q filters are sequentially tuned in a stepwise manner, the amount of energy each filter passes is stored by the paystation's micro-controller. The output of the transmitter filter, which contains audio (voice) signals which originate only from the paystation calling party, is subtracted from the output of the receiver circuit-associated filter. As a consequence, any voice signals that are present on the line will be correctly identified by the answer supervision mechanism employed by the paystation's micro-controller to have originated from the called station.

Prior to performing answer supervision operations, line calibration of the filter function is conducted by sequentially scanning a series of tones across the audio frequency band into the transmitter and monitoring the output of the receiver-associated filter, in order to derive a transmitter-modifier (multiplier) function, representative of the effects the circuit components and the line (e.g. echo path delay) have on signals sourced at the transmitter. This transmitter-modifier function is then applied to the output of the receiver-associated filter during answer supervision, in order to adjust any transmitter-source audio signals to a level that will permit them to be correctly excised from the receiver filter's output.

The answer supervision circuit can be used, for example, in an integrated COCOT and regulated telephone system such as described in co-pending application Ser. No. 07/740,841 filed on even date herewith and being commonly assigned to the assignee of the present invention.

DETAILED DESCRIPTION

Figure 1:
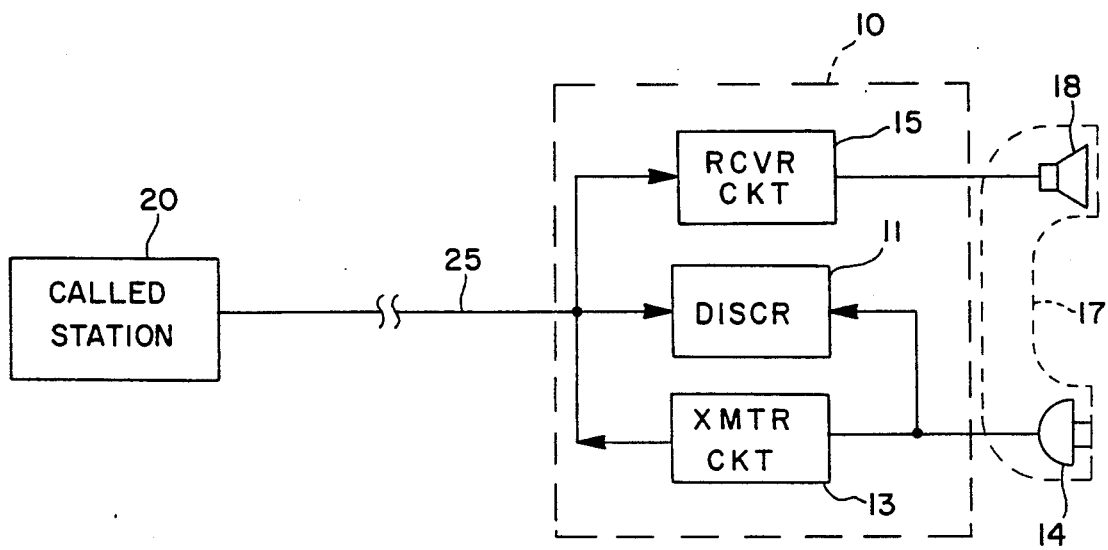
FIG. 1 diagrammatically illustrates a paystation having an answer supervision audio signal discriminator as part of the signal processing circuitry which is coupled to each of a transmitter circuit and telephone line receiver circuit.

Referring now to FIG. an embodiment of an answer supervision circuit in accordance with the present invention is diagrammatically illustrated as being provided within the signal processing circuitry of a paystation 10 and comprises an audio signal discriminator 11, which is coupled to each of a conventional paystation transmitter circuit 13 and telephone line receiver circuit 15. Each of transmitter circuit 13 and telephone line receiver circuit 15 is coupled in a conventional manner to a telephone line 25. Transmitter circuit 13 receives user voice signals by way of a microphone 14 of a handset 17. Handset 17 also includes an earpiece speaker element 18 to which telephone line receiver circuit 15 is coupled.

Figure 2:
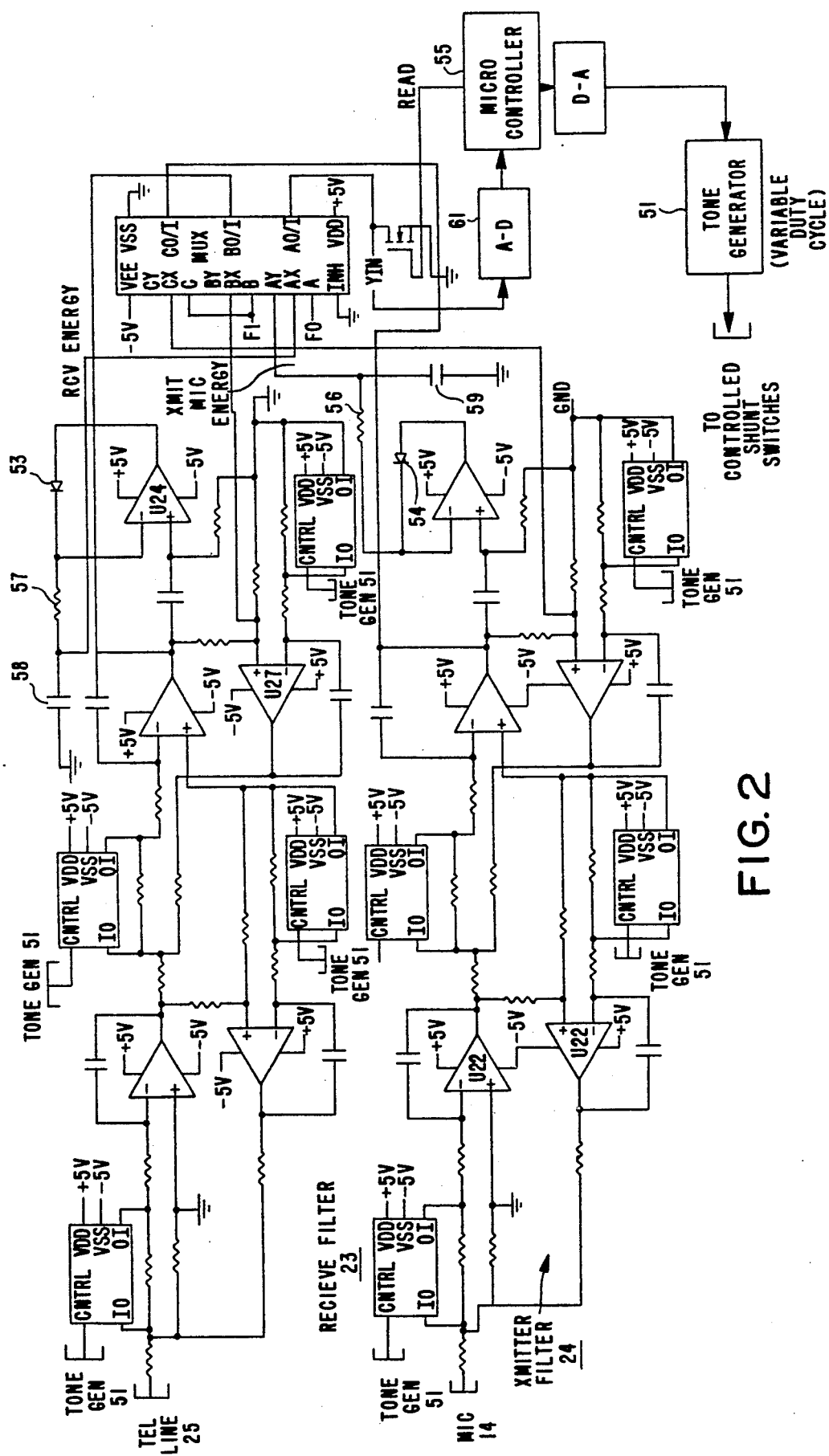
FIG. 2 is a schematic diagram of an audio signal discriminator circuit.

As pointed out above, in accordance with the improved answer supervision circuit of the present invention, its audio signal discriminator 11 is operative to remove audio (voice) signals (input to the transmitter circuit 13 by Way of microphone 14) from signals received by telephone line receiver circuit 15, so that voice signals from the paystation user will not be erroneously interpreted as being sourced from a called station 20. For this purpose, as shown in schematic detail in FIG. 2, audio signal discriminator 11 is comprised of a first tunable bandpass filter 23 coupled in circuit with the telephone line 25, and a second tunable bandpass filter 24 which is coupled to transmitter circuit 13. Each of bandpass filters 23 and 24 preferably comprises an adjustable-Q bandpass filter formed of a plurality of cascaded filter stages intercoupled to form an eighth order tunable audio bandpass filter. Tuning (Q-adjustment) of each of bandpass filters 23, 24 is accomplished by controlling the time constants of the respective stages of the filter, in particular by controlling the value of a variable resistor 26 through which the transfer function of the respective filter stage is defined.

Figure 3:
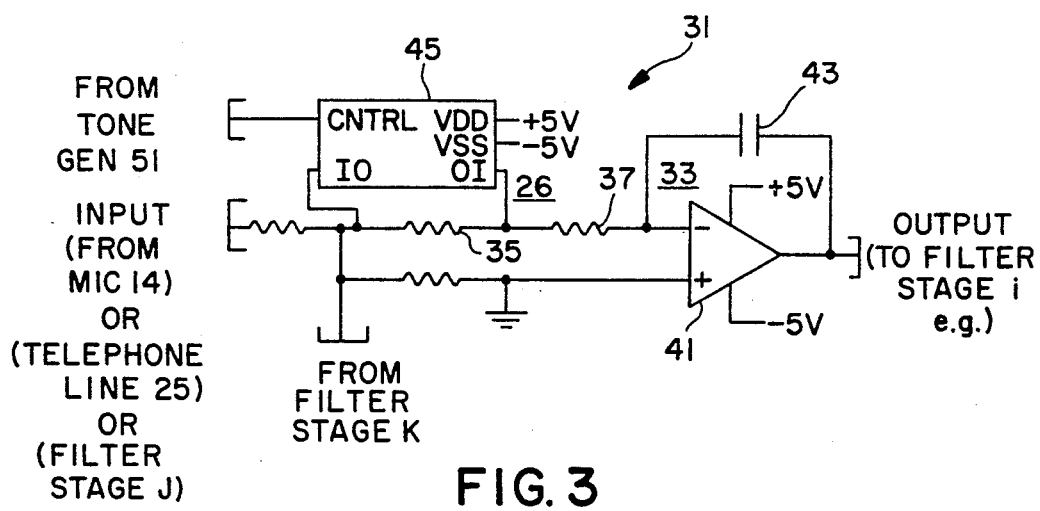
FIG. 3 diagrammatically shows a time constant control network of a respective filter stage of the audio signal discriminator circuit of FIG. 2.

In particular, as shown in FIG. 3, the time constant control network 31 of a respective filter stage 33 includes a pair of series-connected resistor elements 35, 37 coupled in the signal coupling path to one of the inputs of an operational amplifier 41, between input and output ports of which a capacitor 43 is coupled. As shown in schematic detail in FIG. 2, plural ones of such a filter stage 33 are interconnected with one another, to define the requisite pole and zero characteristics of the intended bandpass filter function. Coupled in shunt with each resistor element 35 is a controllable by-pass switch 45 which, when closed, reduces the effective resistance in the input signal coupling path to the operational amplifier and thereby alters the time constant of network 31. Pursuant to a preferred embodiment of the invention, the closure of by-pass switch 45 is modulated by means of a constant frequency, variable duty cycle, triangular wave signal supplied by a tone generator 51, under the control of the paystation's microcontroller 55. During answer supervision, microcontroller 55 repeatedly stepwise increases the duty cycle of the output wave from tone generator ␣1, thereby sweeping the duty cycle of the controlled shunting of resistor 35 by-pass switch 45. This stepping of the duty cycle is effective to step-wise scan the center frequency to which each bandpass filter 23, 24 is tuned (e.g. from a frequency on the order of 250 to 3200 Hz), so that the audio spectrum sensitivity of filters 23, 24 can be repeatedly scanned.

The outputs of filters 23, 24 are rectified by diodes 53, 54 and coupled through resistors 56, 57 to respective capacitors 58, 59. The respective quantities of charge stored in capacitors 58, 59, at each step in the scan, represent the amount of energy passed through the bandpass filters during the respective scanning at each step of the audio band. Capacitors 58, 59, in turn, are coupled to respective inputs of an analog-to-digital converter 61, the output of which is read by microcontroller 55. The answer supervision signal processing program within microcontroller 55 is effective to subtract the electrical energy contained in signals passed through tunable bandpass filter 24 and stored on capacitor 59 from electrical energy contained in signals passed through tunable bandpass filter 23 and stored o capacitor 58. Since the energy stored by capacitor 59 represents audio (voice) inputs from the paystation handset's microphone during call progress evaluation, subtraction of this voice input from the energy stored on capacitor 58 (which represents whatever audio has been applied to the telephone line) effectively prevents the microcontroller from misinterpreting calling paystation voice signals as coming from the called station. Thus, the subtraction operator resident in microcontroller 55 permits an accurate analysis of audio signals on the telephone line for the presence of voice signals from the called station, thereby permitting a determination of whether or not a call placed from the paystation has been answered by the called station.

In order to accommodate effects that circuit components and the telephone line have on signals sourced from the transmitter circuit, a precursor training tone sequence covering the audio band of filters 23, 24 is applied from tone generator 51 to the transmitter circuit to the line and receiver bandpass filter 23 is sequentially tuned as described above. For each frequency step, the output of the filter as represented by the stored charge on capacitor 58 is stored in memory. These stored values are then mapped into a look-up table to which output of filter 23 is applied in order to derive a signal modifier mechanism which is used to adjust the output of bandpass filter 23 during answer supervision. Namely, during a calibration mode, a series of tone signals (e.g. 200 Hz, 400 Hz, 600 Hz, 800 Hz, . . . , 3200 Hz) are coupled through the transmission circuit path to which audio (voice) signals from microphone 14 are applied, so as to effectively simulate a signalling sequence that encompasses the audio frequency range expected to be encountered by signals on the telephone line 25 during answer supervision. Since the calibration frequency scan covers the band of frequencies that may be injected onto the line from the paystation transmitter, mapping what is seen on the line by bandpass filter 23 into a transmitter circuit compensation look-up table allows its output to be adjusted during answer supervision mode, so as to perform a corresponding correction of any audio signals that are sourced from the transmitter circuit, so that what is analyzed by microcontroller 55 after subtraction of the output of filter 24 is an accurate representation of audio signals from the called station.

As will be appreciated from the foregoing description, the problem of a called party hanging up because of the called station's inability to receive voice signals from a muted COCOT paystation microphone during answer supervision is obviated in accordance with the call progress circuit of the present invention which, rather than require that the paystation transmitter's microphone be muted, controllably removes any audio signals that originate at the paystation transmitter during answer supervision. Since tuning of the bandpass filters of the audio signal discriminator, which removes the transmitter-sourced audio signals, is advantageously accomplished as a function of the duty cycle of the variation of a set of filter stage resistors, rather than as a function of frequency, as would be the case of using a switched capacitor filter network, current requirements are reduced substantially.

While I have shown and described an embodiment in accordance with the present invention, it is to be understood that the same is not limited thereto but is susceptible to numerous changes and modifications as known to a person skilled in the art, and I therefore do not wish to be limited to the details shown and described herein but intend to cover all such changes and modifications as are obvious to one of ordinary skill in the art.

What is claimed:

1. For use with a paystation telephone having a transmitter circuit through which voice signals from a paystation user are applied to a telephone line to which the paystation is connected for transmission to a called station, a method for determining whether a call placed from said paystation to the called station has been answered by the called station, comprising the steps of:
   (a) monitoring the telephone line for the presence of signals that have been applied to the telephone line, including signals that ma be applied to the telephone line from the calling paystation; and
   (b) discriminating, from signals monitored in step (a), signals that have bee applied to the telephone line from the calling paystation transmitter.

2. A method according to claim 1, wherein step (b) includes the step of analyzing signals received in step (a), and from which signals from the calling paystation transmitter have been discriminated, for the presence of voice signals, thereby indicating that the called station has answered the call.

3. For use with a paystation telephone having a transmitter circuit through which voice signals from a paystation user are applied to a telephone line to which the paystation is connected for transmission to a called station, a method for determining whether a call placed from said paystation to the called station has been answered by the called station, comprising the steps of:
   (a) monitoring the telephone line for the presence of signals that have been applied to the telephone line, including signals from the calling paystation;
   (b) removing, from signals monitored in step (a), signals that have been applied to the telephone line from the calling paystation transmitter; and
   (c) analyzing signals obtained from step (b) for the presence of voice signals from said called station, thereby indicating that the call placed from said paystation has been answered by said called station.

4. For use with a paystation telephone having a transmitter circuit through which voice signals from a paystation user are applied to a telephone line to which the paystation is connected for transmission to a called station, an apparatus for determining whether a call placed from said paystation to the called station has been answered by the called station, comprising:
   a telephone line receiver circuit which monitors the telephone line for the presence of signals that have been applied to the telephone line, including signals from the calling paystation transmitter circuit;
   a discriminator, coupled to the paystation transmitter circuit and to said telephone line receiver circuit, which removes, from signals received by said telephone line receiver circuit from said telephone line, signals that are applied to the telephone line by way of the calling paystation transmitter circuit; and
   a signal analyzer, coupled to said discriminator, which analyzes signals output thereby for the presence of voice signals, thereby determining whether or not a call placed from said paystation has been answered by said called station.

5. An apparatus according to claim 4, wherein said discriminator comprises a first tunable bandpass filter coupled to said telephone line, a second tunable bandpass filter coupled to said transmitter circuit and a circuit which subtracts electrical energy contained in signals from said second tunable bandpass filter from electrical energy contained in signals from said first tunable bandpass filter, to thereby remove from signals received by said telephone line receiver circuit, signals that are applied to the telephone line by way of the calling paystation transmitter circuit.

6. An apparatus according to claim 5, wherein said discriminator further includes an audio spectrum scanner which sequentially adjusts the frequency sensitivity characteristics of said first and second bandpass filters over a range of audio frequencies that encompasses both voice and specified signalling, such as busy and ringing tones, expected to be encountered on the telephone line.

7. An apparatus according to claim 6, wherein said first and second bandpass filters comprise adjustable-Q bandpass filters, and wherein said audio spectrum scanner is operative to apply to each filter a constant frequency, variable duty cycle control signal, so as to sequentially perform Q-adjustment of each filter.

8. An apparatus according to claim 7, wherein each adjustable-Q bandpass filter is comprised of a set of filter stages, the transfer function of each of which is effected by means of a respective variable resistor, and wherein said audio spectrum scanner is operative to apply to each filter stage said constant frequency, variable duty cycle control signal, and thereby control the value of said respective resistor, so that tuning of the bandpass filter's center frequency is a function of the duty cycle of the variation in its filter stages' resistor values.

9. An apparatus according to claim 8, wherein said signal analyzer is operative to subtract electrical energy contained in signals from said second tunable bandpass filter from electrical energy contained in signals from said first tunable bandpass filter, to thereby remove from signals received from said telephone line signals sourced from said transmitter circuit, and to analyze difference signals obtained thereby for the presence of voice signals, thereby determining whether or not a call placed from said paystation has been answered by said called station.

10. An apparatus according to claim 5, wherein said signal analyzer contains a transmitter signal modifier mechanism representative of effects that circuit components and the telephone line have on signals sourced from said transmitter circuit, said transmitter signal modifier mechanism being applied to the output of said first bandpass filter in order to adjust transmitter-sourced signals to a level that will permit them to be correctly removed at the output of said discriminator.

11. An apparatus according to claim 10, wherein said transmitter signal modifier mechanism is derived by performing line calibration of the filter function of said first bandpass filter by sequentially scanning a series of audio tones across the audio frequency band into the transmitter circuit and monitoring the output of said first bandpass filter.

* * * * *